(12) United States Patent
Kumar

(10) Patent No.: US 10,382,322 B2
(45) Date of Patent: Aug. 13, 2019

(54) DATA ROUTING FOR ELECTRONIC DEVICES

(71) Applicant: SAP SE, Walldorf (DE)

(72) Inventor: Dinesh Kumar, Calicut (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/948,058

(22) Filed: Nov. 20, 2015

(65) Prior Publication Data

US 2017/0149656 A1    May 25, 2017

(51) Int. Cl.
| | |
|---|---|
| H04L 12/725 | (2013.01) |
| H04L 12/24 | (2006.01) |
| H04L 29/08 | (2006.01) |
| H04L 12/707 | (2013.01) |
| H04L 29/06 | (2006.01) |
| H04L 12/721 | (2013.01) |
| H04L 12/715 | (2013.01) |
| H04L 12/741 | (2013.01) |
| H04L 12/751 | (2013.01) |

(52) U.S. Cl.
CPC ........ H04L 45/306 (2013.01); H04L 41/0668 (2013.01); H04L 45/02 (2013.01); H04L 45/127 (2013.01); H04L 45/22 (2013.01); H04L 45/46 (2013.01); H04L 45/74 (2013.01); H04L 63/0428 (2013.01); H04L 63/08 (2013.01); H04L 67/12 (2013.01)

(58) Field of Classification Search
CPC ... G06F 11/3476; H04L 63/0428; H04L 63/18
USPC ...................................... 709/228; 455/456.2
See application file for complete search history.

(56) References Cited

U.S. PATENT DOCUMENTS

| | | | |
|---|---|---|---|
| 6,266,704 B1 * | 7/2001 | Reed | ............... H04L 45/00 709/238 |
| 7,719,989 B2 | 5/2010 | Yau | |
| 7,865,717 B2 | 1/2011 | Calcev et al. | |
| 7,904,710 B2 | 3/2011 | Rits et al. | |
| 8,045,567 B2 | 10/2011 | Chava et al. | |
| 8,086,863 B2 | 12/2011 | Rits | |

(Continued)

FOREIGN PATENT DOCUMENTS

EP    2187576 A1    5/2010

OTHER PUBLICATIONS

U.S. Patent Application filed by same inventor on Oct. 30, 2014, U.S. Appl. No. 14/527,790 (not yet published).

(Continued)

*Primary Examiner* — Asad M Nawaz
*Assistant Examiner* — Jason A Harley
(74) *Attorney, Agent, or Firm* — Fountainhead Law Group P.C.

(57) ABSTRACT

Some embodiments provide a non-transitory machine-readable medium that stories a program executable by at least one processing unit of a device. The program classifies several connected devices based on to a history of data transfers among the several connected devices. The program also receives a route request for transmitting a data message from a first device in the several connected devices to a second device in the several connected devices. The program further determines, based on the classification of the several connected devices, a route through the several connected devices that starts at the first device and ends at the second device.

20 Claims, 7 Drawing Sheets

(56) References Cited

U.S. PATENT DOCUMENTS

| | | | |
|---|---|---|---|
| 2004/0252643 A1 | 12/2004 | Joshi | |
| 2005/0243830 A1* | 11/2005 | Wrenn | H04L 45/02 370/394 |
| 2006/0121909 A1* | 6/2006 | Welsh | H04W 24/10 455/450 |
| 2012/0224474 A1 | 9/2012 | Beser | |
| 2013/0315077 A1 | 11/2013 | Toshiaki et al. | |
| 2015/0020164 A1 | 1/2015 | Tankov et al. | |
| 2015/0195192 A1 | 7/2015 | Vasseur et al. | |
| 2015/0264627 A1* | 9/2015 | Perdomo | H04W 40/12 370/329 |
| 2016/0088438 A1* | 3/2016 | O'Keeffe | H04W 4/21 455/456.2 |

OTHER PUBLICATIONS

Extended European Search Report dated Apr. 20, 2017 for EP Appln. 16002008.7; 10 pages.

Dong-Hyun Kim et al., "Trafffice Load and Lifetime Deviation Based Power-Aware Routing Protocol for Wireless Ad Hoc Networks", Wired/Wireless Internet Communications Lecture Notes in Computer Science; Jan. 1, 2006, pp. 325-336.

Durresi Arjan et al., "Anonymous Routing in Wireless Mobile Ad Hoc Networks to Prevent Location Disclosure Attacks", Network and Parallel Computing, Dec. 6, 2005, pp. 238-247.

Marchang et al. "Light-Weight Trust-Based Routing Protocol For Mobile Ad Hoc Networks" IET Information Secur., vol. 6, No. 2, Jun. 11, 2012, pp. 77-83.

Khalil et al. "UnMask: Utilizing Neighbor Monitoring for Attack Mitigation in Multihop Wireless Sensor Networks", Ad Hoc Networks, Elsevier, vol. 8, No. 2, Mar. 1, 2010, pp. 148-164.

Airehrour, et al. "GradeTrust: A Secure Trust Based Routing Protocol for MANETs", 2015 International Telecommunication Networks and Applications Conference (ITNAC), IEEE, Nov. 18, 2015, pp. 65-70.

EP Office Action dated Mar. 11, 2019 for EP Application No. 16002008.7, 10 pages.

* cited by examiner

DATA ROUTING FOR ELECTRONIC DEVICES

BACKGROUND

In recent years, the number of electronic devices has increased at a rapid rate. During this time, the advancement and development of electronics has allowed sensors, embedded systems, firmware, network components, etc. to be included in devices such as mobile devices, automobile sensors, computers, climate sensors, heart-beat monitors, thermostat systems, refrigerators, washing machines, etc. A network of such devices may be referred to as an Internet of Things (IoT). IoT devices may collect and exchange data, which may be processed and/or analyzed to produce meaningful results.

SUMMARY

In some embodiments, a non-transitory machine-readable medium stores a program executable by at least one processing unit of a device. The program classifies several connected devices based on to a history of data transfers among the several connected devices. The program also receives a route request for transmitting a data message from a first device in the several connected devices to a second device in the several connected devices. The program further determines, based on the classification of the several connected devices, a route through the several connected devices that starts at the first device and ends at the second device.

In some embodiments, the route request further specifies encryption of route information associated with the determined route. The program may selectively encrypt the route information. In some embodiments, the route for transmitting the data message goes through a third device and a fourth device in the several connected devices. The program may receive a request from a third device to authenticate and validate the data transfer in order for the third device to forward the data message to the fourth device. In some embodiments, the program calculates metrics for each device in the several connected devices based on the history of data transfers. Classifying the several connected devices may include classifying the several connected devices based on the calculated metrics.

In some embodiments, classifying the several connected devices includes classifying a third device in the several connected devices as a type of device that forwards data messages to devices other than one or more neighboring devices of the third device. The type of device may be a first type of device. Classifying the several connected devices may include classifying a fourth device in the several connected devices as a second type of device that is involved in several failed data transfers. Determining the route through the several connected devices may include including devices in the several connected devices in the route other than the third and fourth devices.

In some embodiments, a method classifies several connected devices based on to a history of data transfers among the several connected devices. The method also receives a route request for transmitting a data message from a first device in the several connected devices to a second device in the several connected devices. The method further determines, based on the classification of the several connected devices, a route through the several connected devices that starts at the first device and ends at the second device.

In some embodiments, the route request further specifies encryption of route information associated with the determined route. The method may selectively encrypt the route information. In some embodiments, the route for transmitting the data message goes through a third device and a fourth device in the several connected devices. The method may receive a request from a third device to authenticate and validate the data transfer in order for the third device to forward the data message to the fourth device. In some embodiments, the method calculates metrics for each device in the several connected devices based on the history of data transfers. Classifying the several connected devices may include classifying the several connected devices based on the calculated metrics.

In some embodiments, classifying the several connected devices includes classifying a third device in the several connected devices as a type of device that forwards data messages to devices other than one or more neighboring devices of the third device. The type of device may be a first type of device. Classifying the several connected devices may include classifying a fourth device in the several connected devices as a second type of device that is involved in several failed data transfers. Determining the route through the several connected devices may include including devices in the several connected devices in the route other than the third and fourth devices.

In some embodiments, a system includes a classification manager configured to classify several connected devices based on to a history of data transfers among the several connected devices. The system further includes a routing manager configured to receive a route request for transmitting a data message from a first device in the several connected devices to a second device in the several connected devices. The routing manager is further configured to determine, based on the classification of the several connected devices, a route through the several connected devices that starts at the first device and ends at the second device.

In some embodiments, the route request further specifies encryption of route information associated with the determined route. The system may further include an encryption manager configured to selectively encrypt the route information. In some embodiments, the route for transmitting the data message goes through a third device and a fourth device in the several connected devices. The system may further include a data transfer manager configured to receive a request from a third device to authenticate and validate the data transfer in order for the third device to forward the data message to the fourth device. In some embodiments, the classification manager is further configured to calculate metrics for each device in the several connected devices based on the history of data transfers. The classification manager may classify the several connected devices by classifying the several connected devices based on the calculated metrics.

In some embodiments, the classification manager classifies the several connected devices by classifying a third device in the several connected devices as a first type of device that forwards data messages to devices other than one or more neighboring devices of the third device and classifying a fourth device in the several connected devices as a second type of device that is involved in several failed data transfers. The routing manager may determine the route through the several connected devices by including devices in the several connected devices in the route other than the third and fourth devices.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for routing data through a network of devices. In some embodiments, different devices in the network may be classified differently based on the history of data transfers among the devices in the network. Routing data among devices in the network may be determined based on the different classifications of devices in the network. In some embodiments, routing information of data to be forwarded in the network is selectively encrypted.

Figure 1:
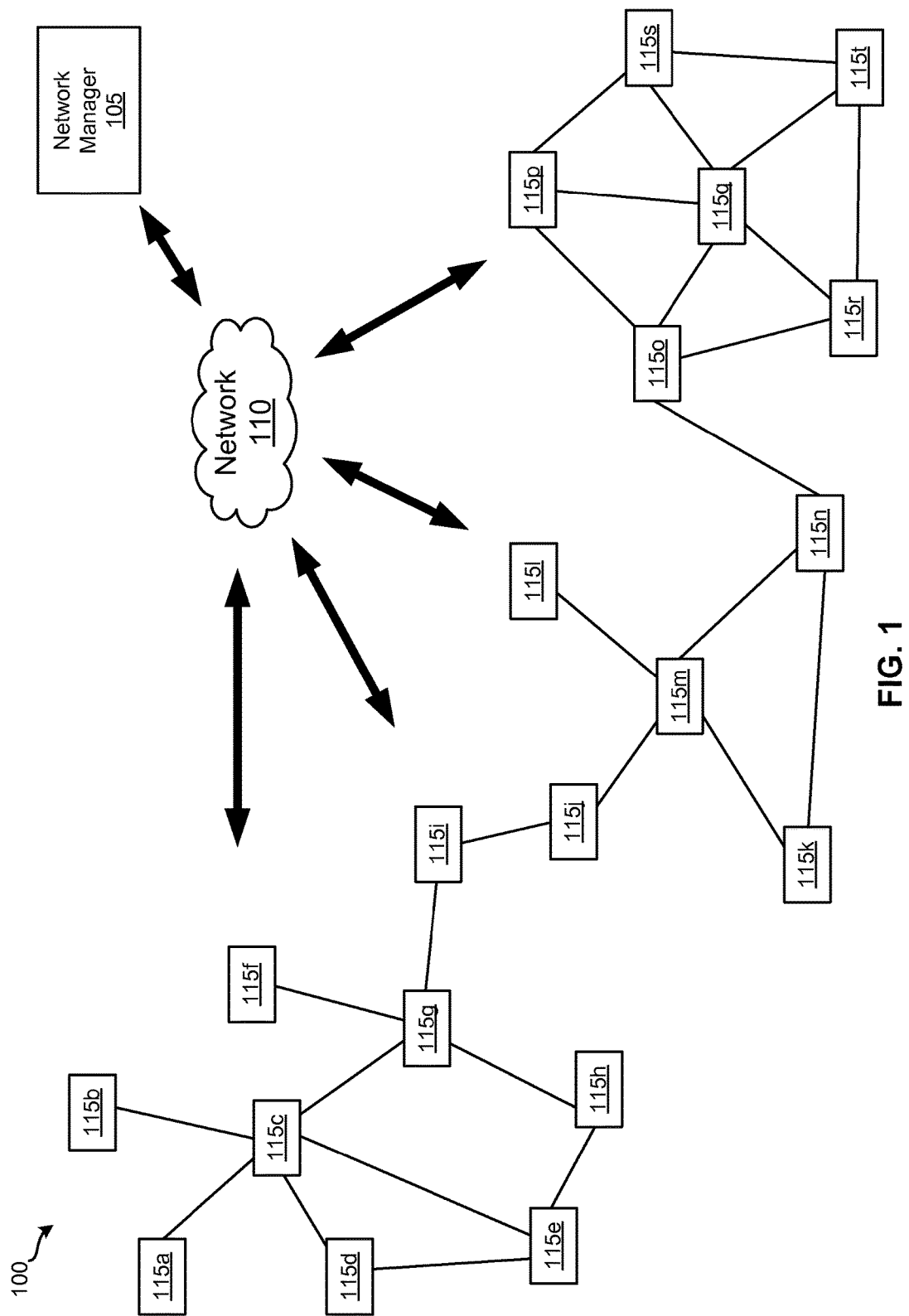
FIG. 1 illustrates a system for data routing according to some embodiments.

FIG. 1 illustrates a system 100 for data routing according to some embodiments. In some embodiments, system 100 is an IoT-based system. The routing of data in system 100 may be implemented at the application layer in some embodiments. As shown, system 100 includes network manager 105, network 110, and devices 115a-t. Network 110 may be any type of network such as local area network (LAN), a wide area network (WAN), a metropolitan area network (MAN), an intranet, a network of networks, the Internet, etc.

As shown in FIG. 1, devices 115a-t form a network of devices. Devices 115a-t are configured to communicate data among each other as well as with network manager 105 via network 110. In order to communicate with other devices 115 and network manager 105, a particular device 115 is enrolled in system 100. During enrollment, a client application may be installed on the particular device 115. In addition, the particular device 115 may generate a public key and private key pair and transmit the public key associated with the particular device 115 to the network manager 105 for later use. The particular device 115 may also receive and store a public key associated with network manager 105, which is part of a public key and private key pair generated by network manager 105. In some embodiments, enrollment of the particular device 115 may include the particular device 115 authenticating the identity of network manager 105. For example, secure sockets layer (SSL) certificates may be used to authenticate the identity of network manager 105. In some embodiments, an authentication method is established between the particular device 115 and network manager 105 during enrollment. For example, the particular device 115 may send a device identifier (ID) that uniquely identifies the particular device 115 and a unique key or password to network manager 105. Network manager 105 may subsequently use the device ID and unique key or password for authenticating the identity of the particular device 115.

Each of the devices 115a-t may be one of any number of different types of electronic devices that is configured to communicate with network manager 105. Examples of such types of devices include mobile devices, laptops, desktops, smartphones, tablets, wearable devices, image-capture devices (e.g., still-image capture devices, video capture devices, etc.), sensors (e.g., pressure sensors, temperature sensors, motion sensors, humidity sensors, gas sensors, chemical sensors, radioactive sensors, radiation sensors, light sensors, sound sensors, etc.), appliances (e.g., refrigerators, dishwashers, washing machines, drying machines, food processors, coffee makers, toasters, ovens, etc.), machinery, medical devices (e.g., heart rate monitoring devices, blood pressure monitoring devices, hearing aid devices, etc.), etc.

Network manager 105 is responsible for managing devices 115a-t. For example, network manager 105 may handle enrollment of devices 115a-t. During the enrollment of a particular device 115, network manager 105 transmits to the particular device 115 a public key associated with network manager 105. The public key is part of a public key and private key pair that the network manager 105 generated and maintains. Network manager 105 may also receive a public key associated with the particular device 115, which, as described above, the particular device 115 generated as part of a public key and private key pair. As such, network manager 105 stores and manages the public keys associated with devices 115a-t. In some embodiments, enrollment of a particular device 115 may include network manager 105 authenticating the identity of the particular device 115. As mentioned above, in some embodiments, an authentication method is established between the particular device 115 and network manager 105 during enrollment. For example, the particular device 115 may send a device identifier (ID) that uniquely identifies the particular device 115 and a unique key or password to network manager 105. Network manager 105 may subsequently use the device ID and unique key or password for authenticating the identity of the particular device 115.

Network manager 105 may communicate data with devices 115a-t. Additionally, network manager 105 may facilitate the communication of data among devices 115a-t. For example, in some embodiments, network manager 105 generates and maintains a device graph (also referred to as enrolled device graph) of all the devices enrolled in system 100 and the connections between the enrolled devices. When a new device is enrolled in system 100, network manager adds the newly enrolled device into the enrolled device graph. In this example, network manager 105 generates and maintains an enrolled device graph that includes devices 115a-t and specifies the connections between devices 115a-t as illustrated in FIG. 1. In some such embodiments, network manager 105 determines routes for forwarding data among devices 115a-t based on the enrolled device graph. Network manager 105 may be implemented by a one or more computing devices (e.g., servers). Different functions of network manager 105 may be implemented across different computing devices in different embodiments. For instance, the enrollment function may be implemented in one computing device (e.g., an enrollment server) while the remaining functions of network manager 105 may be implemented on another computing device.

Network manager 105 may group devices into groups of devices (also referred to as device groups). For each device group, network manager 105 generates and maintains a device graph (also referred to as a device group graph) that includes the devices in the device group and specifies the connections between the devices in the device group. In some embodiments, a device group graph is a subgraph of the enrolled device graph. A device group may include the same type devices (also referred to as a homogenous device group) or may include different types of devices (also referred to as a heterogeneous device group).

In some embodiments, network manager 105 may not form any device groups until the number of devices enrolled in system 100 reaches a defined number (e.g., 25 devices, 50 devices, 100 devices, etc.). Once network manager 105 has formed device groups and a new device is enrolled in system 100, network manager adds the newly enrolled device into a device group (e.g., by adding the newly enrolled device into the device group graph that corresponds to the device group). As new devices are enrolled in system 100 and added to device groups, network manager 100 may split (e.g., using any of the methodologies discussed below on the device group graph) a particular device group into two or more device groups when the number of devices in the particular device group reaches a defined number (e.g., 25 devices, 50 devices, 100 devices, etc.).

Network manager 105 employs different methodologies for grouping devices into device groups in different embodiments. For example, in some embodiments, network manager 105 uses a strongly-connected components technique (e.g., Kosaraju's algorithm, Tarjan's strongly connected components (SCC) algorithm, path-based strong component algorithm, etc.) on a device graph (e.g., an enrolled device graph or a device group graph) in order to group devices in the device graph into device groups. In some embodiments, network manager 105 utilizes a graph cutting technique (e.g., Karger's algorithm, etc.) on a device graph (e.g., an enrolled device graph or a device group graph) in order to group devices in the device graph into device groups. One of ordinary skill in the art will realize that network manager 105 may use any number of additional and/or different techniques (e.g., grouping based on same and/or similar device types, geographical location, etc.).

Figure 2:
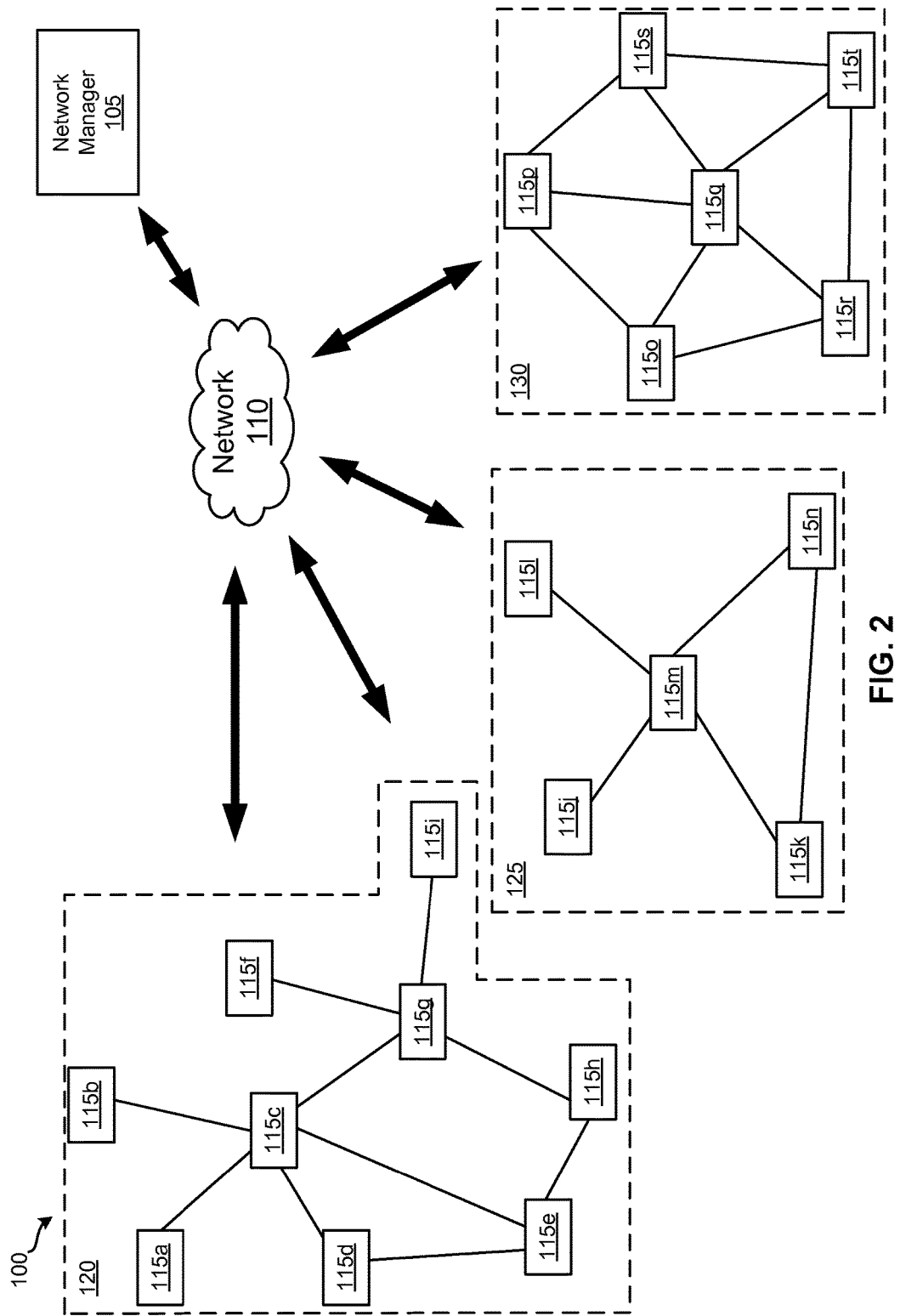
FIG. 2 illustrates a system that includes devices grouped into several device groups according to some embodiments.

FIG. 2 illustrates system 100 that includes devices grouped into several device groups according to some embodiments. In particular, FIG. 2 illustrates system 100 after network manager 105 groups devices 115a-t grouped into three device groups 120, 125, and 130 using any of the methodologies described above. Device group 120 includes devices 115a-i, device group 125 includes devices 115j-n, and device group 130 includes devices 115o-t. FIG. 2 does not show connections between devices in different device groups for the purposes of simplicity and explanation. One of ordinary skill in the art will understand that devices 115a-t are actually connected in the manner illustrated in FIG. 1.

Network manager 105 manages various types of data associated with system 100. For example, network manager 105 may collect and store a history of data transfers among devices 115a-t. In some embodiments, network manager 105 stores the history of data transfers among devices 115a-t in an enrolled device transfer graph. Network manager 105 may also store the history of data transfers among devices 115 in each device group in a device group transfer graph. The data transfers among devices 115a-t include successful data transfers and failed data transfers.

Based on the data transfer history, network manager 105 may calculate and store a variety of metrics for devices 115a-t in some embodiments. For instance, network manager 105 may calculate a credibility factor (CF) value for each device 115 in system 100. In some such embodiments, a CF value for a device 115 is a ratio of the number of successful data transfers to the number of total requested data transfers that involves device 115. Network manager 105 may calculate, in some embodiments, cooperative index (CI) values for each device 115 in system 100. In some such embodiments, a $CI_{i,j}$ value for a device 115 is a ratio of the number of successful data forwards from device i to device j to the number of total requested data forwards from device i to device j, where device j is a neighboring device of device i. Thus, a device 115 may have a CI value for each neighboring device of the device 115. Referring to FIG. 2 as an example, network manager 105 may calculate three CI values for device 115o: a $CI_{115o,115p}$ based on data transfers from device 115o to device 115p, a $CI_{115o,115q}$ based on data transfers from device 115o to device 115q, and a $CI_{115o,115r}$ based on data transfers from device 115o to device 115r. One of ordinary skill in the art will understand that a $CI_{i,j}$ value based on data transfers from device i to device j may not be the same as a $CI_{j,i}$ value based on data transfers from device j to device i. In some embodiments, network manager 105 may calculate an average CI value for a device 115 by averaging the CI values based on transfers from device 155 to its neighboring devices.

Network manager 105 may classify devices 115a-t as certain types of devices based on the calculated metrics discussed above. For example, network manager 105 classifies a device 115 as a neutral device if the device 115 has a CF value that is less than a threshold CF value (e.g., 0.7, 0.8, etc.). Such a threshold CF value may be referred to as a neutral device threshold CF value. In some embodiments, network manager 105 classifies a device 115 as a neutral device if the device 115 has a length of history of data transfers involving the device 115 that is less than a defined amount of time (e.g., five days, a week, a month, etc.) and/or has a number of data transfers involving the device 115 that is less than a threshold number (e.g., 25 data transfers, 50 data transfers, 100 data transfers, etc.) of data transfers. In some such embodiments, network manager 105 assigns such a device 115 with an initial CF value (e.g., 0.3, 0.4, 0.5, etc.). When the device 115 has a length of history of data transfers involving the device 115 that is greater than or equal to the defined amount of time and/or has a number of data transfers involving the device 115 that is greater than or equal to the threshold number of data transfers, network manager 105 calculates a CF value for the device 115 in the manner described above and classifies the device 115 based on the calculated CF value.

In some embodiments, network manager 105 classifies a device 115 as a friendly device if the device 115 has a CF value that is greater than or equal to the neutral device threshold CF value. In other embodiments, network manager 105 classifies a device 115 as a friendly device if the device 115 has a CF value that is greater than or equal to the neutral device threshold CF value and the device 115 has a length of history of data transfers involving the device 115 that is greater than or equal to a defined amount of time (e.g., five days, a week, a month, etc.). In some embodiments, network manager 105 does not classify a device 115 as a friendly device if the device 115 is classified as a biased device. Details of classifying devices as biased devices are described below.

Network manager 105 may classify a device 115 as a device group manager if the device 115 has a CF value that is greater than or equal to a threshold CF value (e.g., 0.9, 0.95, etc.) in some embodiments. This threshold CF value may be referred to as a device group manager threshold CF value. In some instances, the device group manager threshold CF value may be greater than the neutral device threshold CF value. In other embodiments, network manager 105 may classify a device 115 as a device group manager if the device 115 has a CF value that is greater than or equal to the device group manager threshold CF value and the device 115 has a length of history of data transfers involving the device 115 that is greater than or equal to a defined amount of time (e.g., five days, a week, a month, etc.). In some embodiments, network manager 105 determines whether to classify a device 115 as a device group manager if the device 115 is classified as friendly device. In some such embodiments, network manager 105 does not classify a device 115 if the device is, or has been in the past, classified as a biased device or unfriendly device. Details of classifying devices as biased devices and unfriendly devices are described below.

In some embodiments, network manager 105 classifies a device 115 as a biased device if the device 115 has a CF value that is greater than or equal to the neutral device threshold CF value and the device 115 fails to forward data to one or more neighboring devices. In other embodiments, network manager 105 classifies a device 115 as a biased device if the device 115 has a CF value that is greater than or equal to the neutral device threshold CF value, the device 115 has a length of history of data transfers involving the device 115 that is greater than or equal to a defined amount of time (e.g., five days, a week, a month, etc.), and the device 115 fails to forward data to one or more neighboring devices. Details of determining when a device 115 fails to forward data to neighboring devices is described below.

Network manager 105 may, in some embodiments, classify a device 115 as an unfriendly device if device 115 performs undesirable actions. Examples of undesirable actions include sending invalid, unauthorized, and/or unauthenticated data to other devices; receiving data to be forwarded and not forwarding the data; receiving data to be forwarded and incorrectly forwarding the data (e.g., forwarding the data to invalid devices and/or along invalid routes, thereby preventing destination devices from receiving the data); receiving data to be forwarded and delaying the forwarding of the data; etc. Details of classifying devices as unfriendly devices are described below.

As mentioned above, network manager 105 may calculate, in some embodiments, CI values for each device 115 in system 100. In some such embodiments, network manager 105 may classify a device 115 as a cooperative device if device 115 has a CI value with respect to another device that is greater than or equal to a threshold CI value. In other such embodiments, network manager 105 may classify a device 115 as a cooperative device if device 115 has an average CI value that is greater than or equal to the threshold CI value.

As described above, network manager 105 may classify a device 115 as one of a number of different types of devices. In some embodiments, network manager 105 may classify a device 115 as multiple different types of devices. For instance, network manager 105 may classify a device 115 as a vengeful device with respect to one or more devices 115 and also classy the device 115 as a cooperative device with respect to one or more other devices 115.

In some embodiments, system 100 may operate in several different modes. For example, system 100 may operate in an initialization mode when system 100 is initially started (e.g., network manager 105 is powered on and starts the enrollment process with devices 115). While system 100 is operating in the initialization mode, network manager 105 assigns each newly enrolled device 115 with an initial CF value (e.g., 0.3, 0.4, 0.5, etc.) and an initial CI value (e.g., 1.0) for each neighboring device of the enrolled device 115. In addition, network manager 105 handles data transfer requests from enrolled devices 115 as well as collects and stores (e.g., in an enrolled device transfer graph or a device group transfer graph) the history of data transfers among enrolled devices 115. While system 100 is operating in the initialization mode, network manager 105 may calculate and update (e.g., at defined intervals such as 15 minutes, 1 hour, 12 hours, 1 day, etc.) the CF values and CI values of enrolled devices 115. In some embodiments, network manager 105 does not classify devices 115 while system 100 is operating in initialization mode.

System 100 may operation in a runtime mode after operating in the initialization mode. In some embodiments, system 100 transitions from operating in the initialization mode to operating in the runtime mode when system 100 has operated in the initialization mode for a length of time that is greater than or equal to a defined amount of time (e.g., a day, five days, two weeks, a month, etc.). System 100 may transition, in some embodiments, from operating in the initialization mode to operating in the runtime mode when the number of data transfers (e.g., successful data transfers and failed data transfers, etc.) that have occurred in system 100 is greater than a threshold amount of data transfers. In still some embodiments, system 100 transitions from operating in the initialization mode to operating in the runtime mode when system 100 has operated in the initialization mode for a length of time that is greater than or equal to the defined amount of time and the number of data transfers that have occurred in system 100 is greater than a threshold amount of data transfers.

When system 100 transitions from operating in the initialization mode to operating in the runtime mode, network manager 105 classifies (e.g., according to the techniques described above and below) enrolled devices 115 based on metrics calculated according to the history of data transfers, as described above. Once devices 115 have been classified, network manager 150 may identify devices 115 that are classified as device group managers. If a device group does not have a device group manager, network manager 105 identifies a friendly device (e.g., the friendly device that has the highest CF value) in the device group and classifies the friendly device as a device group manager. In the case where enrolled devices 115 have not been grouped into device groups, if the enrolled devices 115 do not have a device group manager, network manager 105 identifies a friendly device (e.g., the friendly device that has the highest CF value) and classifies the friendly device as a device group manager.

When network manager 105 classifies a device 115 as a device group manager, network manager 105 may instruct the device group manager to identify itself as a device group manager to devices 115 in the device group managed. For instance, in some embodiments, network manager 105 generates a digital signature based on the private key associated with the network manager 105 and sends to a device group manager a digitally signed message indicating that network manager 105 has designated the device 115 as a device group manager. The device group manager forwards (e.g., via multi-cast messaging) the digitally signed message to other devices 115 in the device group. The devices 115 in the device group may verify the authenticity of the digitally signed message using the public key associated with the network manager 105.

Network manager 105 may also synchronize data with a device group manager upon classifying a device 115 as a device group manager. For example, network manager 105 may send CF values and CI values associated with devices 115 in the device group, a device group transfer graph corresponding to the device group, public keys of devices 115 in the device group, Internet Protocol (IP) addresses of devices 115, classifications of devices 115, etc. to the device group manager.

While system 100 is operating in the runtime mode, network manager 105 continues to assign each newly enrolled device 115 with an initial CF value (e.g., 0.3, 0.4, 0.5, etc.) and an initial CI value (e.g., 1.0) with respect to each neighboring device of the enrolled device 115. Network manager 105 may also update, based on the history of data transfers among enrolled devices 115, the CF and CI values associated with devices 115 at defined intervals (e.g., thirty minutes, an hour, twelve hours, a day, etc.). In some embodiments, network manager 105 updates the classification of devices 115 based on the updated history of data transfers, CF values, CI values, etc., at defined intervals (e.g., thirty minutes, an hour, twelve hours, a day, etc.). Additionally, network manager 105 may synchronize CF values, CI values, transfer graphs (e.g., device group transfer graphs), public keys of devices 115, IP addresses of devices 115, classifications of devices 115, etc., with device group managers at defined intervals (e.g., thirty minutes, an hour, twelve hours, a day, etc.).

In some embodiments, network manager 105 performs automatic re-assignment of device group managers into multiple device groups. For example, in some instances where a particular device group does not have a device group manager assigned and the particular device group does not have any devices that can be classified as a device group manager, network manager 105 may check if another device group has a device group manager that can be re-assigned to the group having no device group manager. In some embodiments, network manager 105 determines that a device group manager of another device group may be re-assigned to the particular device group if, after re-assigning the device group manager to the particular device group, the other device group will have at least one other device group manager or one other device that may be classified as a device group manager. If network manager determines that such a device group manager in another device group exists, network manager 105 re-assigns the device group manager of the other group to the particular device group. When network manager 105 determines that such a device group manager in another device group does not exist, network manager 105 assigns a device group manager of another device group as the device group manager of the other device group and the particular device group. That is, such a device group manager is shared between the two device groups. In some embodiments, such a device group manager is shared between the two device groups until a device in the particular device group may be classified as a device group manager of the particular device group. As another example of re-assigning device group managers into multiple device groups, network manager 105 may classify a friendly device in a device group as an additional device group manager to share the load between other device group managers in the device group. In some embodiments, network manager 105 adds device group managers to a device group when the number of data transfers within a device group is greater than a threshold number of data transfers and/or the number of data transfers within a device group for a defined period of time is greater than the threshold number of data transfers.

As a device group manager, a device 115 performs many functions to manage other devices 115 in the device group. For example, a device group manager may manage and update, based on the history of data transfer among devices 115 in the device group, the CF values and CI values associated with devices 115 in the device group and the device group transfer graph. In some embodiments, a device group manager synchronizes the CF values and CI values associated with devices 115 in the device group, the device group transfer graph, public keys of devices 115, IP addresses of devices 115, classifications of devices 115, etc., with network manager 105 at defined intervals (e.g., thirty minutes, an hour, twelve hours, a day, etc.).

Figure 3:
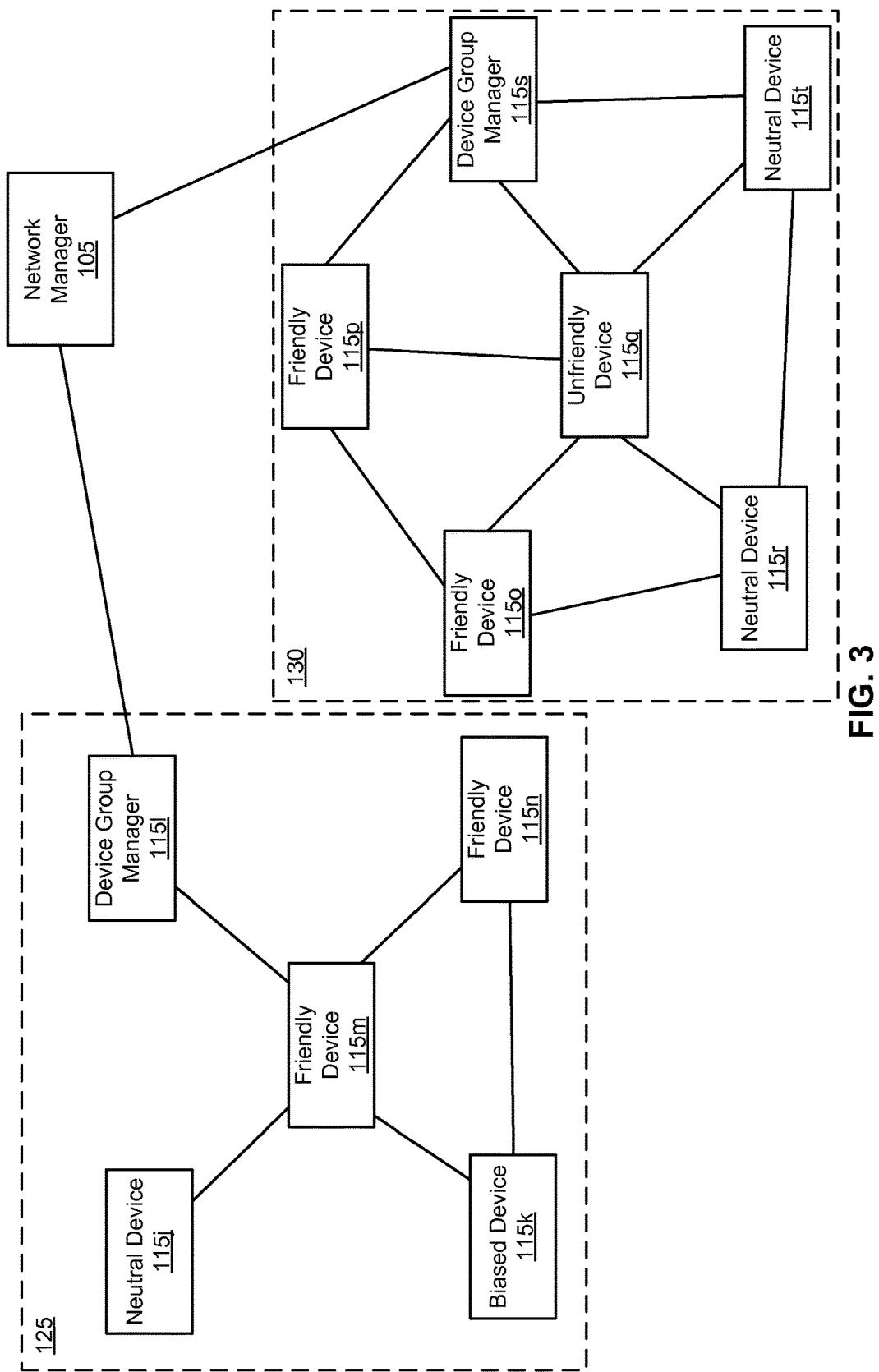
FIG. 3 illustrates classified devices according to some embodiments.

FIG. 3 illustrates classified devices according to some embodiments. Specifically, FIG. 3 illustrates devices 115$j$-$n$ of device group 125 and devices 115$o$-$t$ of device group 130. In this example, network manager 105 has classified (e.g., according to the techniques described above and below) devices 115$l$ and 115$s$ as device group managers, devices 115$j$, 115$r$, and 115$t$ as neutral devices, devices 115$m$, 115$n$, 115$o$, and 115$p$ as friendly devices, device 115$t$ as a biased device, and device 115$q$ as an unfriendly device. An example data transfer operation will now be described by reference to FIG. 3.

For this example, device 115$p$ (also referred to as a source device) sends data to device 115$t$ (also referred to as a destination device). To initiate the data transfer, device 115$p$ sends a data transfer request to device group manager 115$s$ of the device group 130. In response, the device group manager 115$s$ generates a unique transfer identifier (ID) for identifying the data transfer and sends the transfer ID to device 115$p$.

In some embodiments, the source device determines a route for the data transfer using a shortest-path technique (e.g., a Bellman-Ford technique, an A* technique, etc.). One of ordinary skill in the art will appreciate that any number of different techniques may be used to determine a route for transmitting data from a source device to a destination device. If the source device is unable to determine a route for the data transfer, the source device includes in the data transfer request a request for device group manager 115$s$ to determine the route. In this example, the route for the data transfer starts from device 115$p$, goes through devices 115$o$ and device 115$r$ (also referred to as intermediate devices), and ends at device 115$t$.

Device 115$p$ begins the data transfer by generating a data message. In some embodiments, a data message includes a routing portion (e.g., routing header) and a data portion (e.g., a payload). In some embodiments, the routing portion includes routing information for forwarding the data message from a source device to a destination device. Device 115$p$ forwards the data message to device 115$o$ as specified by the routing portion of the data message.

In some embodiments, each device 115 includes a data transfer buffer of transfer IDs of data transfers that the device 115 has recently processed. When device 115$o$ receives the data message, device 115$o$ scans its data transfer buffer for the transfer ID associated with the data transfer from device 115$p$ to device 115$t$. If device 115$o$ the data transfer buffer includes the same transfer ID, device 115$o$ determines that the data transfer is invalid and notifies device group manager 115s that the data transfer is invalid. If device 115o the data transfer buffer does not include the transfer ID, device 115o sends to device group manager 115s a request to authenticate the data transfer.

When device group manager 115s receives such a request from device 115o, device group manager 115s determines whether, based on the device group transfer graph, a number of data forwards of the device (device 115p in this example) from which device 115o received the data message is greater than or equal to a threshold number of data forwards. If the number of data forwards of device 115p is less than the threshold number of data forwards, device group manager 115s sends a request to network manager 105 to authenticate the data transfer.

When network manager 105 receives a request to authenticate the data transfer, network manager 105 identifies the classification of the device (device 115p in this example) from which device 115o received the data message and authenticates the data transfer in the same or similar manner described below that a device group manager (device group manager 115s in this example) authenticates the data transfer. In some embodiments, network manager 105 also synchronizes data (e.g., CF values and CI values associated with devices 115 in the device group, a device group transfer graph corresponding to the device group, public keys of devices 115 in the device group, IP addresses of devices 115, classifications of devices 115, etc.) with the device group manager upon authenticating the data transfer. In some cases, the device (device 115p in this example) from which device 115o received the data message may be a neutral device (e.g., the device recently enrolled in system 100) or a device that has been inactive or has a small amount of transfer activity. In some such cases, if the device (device 115p in this example) from which device 115o received the data message belongs to a defined list (e.g., a blacklist) of unauthorized devices, network manager 105 notifies the device group manager, which, in turn, terminates the data transfer and notifies the source device indicating so. If the device (device 115p in this example) from which device 115o received the data message does not belong to the defined list of unauthorized devices, network manager 105 authenticates the data transfer.

If the number of data forwards of device 115p is greater than or equal to the threshold number of data forwards, device group manager 115s determines whether the device (device 115r in this example) to which device 115o has to forward the data message is a biased or unfriendly device. In some embodiments, if the device to which device 115o has to forward the data message is a biased device or unfriendly device and the device to which device 115o has to forward the data message is the destination device, device group manager 115s authenticates the data transfer and sends a response to device 115o indicating that the data transfer is valid and instructing device 115o to forward the data message to the next device (device 115r in this example). In other embodiments, if device group manager 115s determines that device 115r is an unbiased or unfriendly device, device group manager 115s determines an alternative route for the data transfer. If device group manager 115s is unable to determine an alternate route, device group manager 115s terminates the data transfer and notifies the source device indicating so. If device group manager 115s is able to determine an alternate route, device group manager 115s sends device 115o the alternate route to continue forwarding the data message. For this example, device group manager 115s determines that the number of data forwards of device 115p is greater than or equal to the threshold number of data forwards.

If device group manager 115s determines that device 115r is not an unbiased or unfriendly device, device group manager 115s determines whether the device (device 115p in this example) from which device 115o received the data message is an unfriendly device. If device group manager 115s determines that device 115p is an unfriendly device, then device group manager 115s terminates the data transfer and notifies the source device indicating so. If device group manager 115s determines that device 115p is not an unfriendly device, device group manager 115s determines whether device 115p is a device group manager, a friendly device, or a biased device. If device group manager 115s determines that device 115p is a device group manager or a friendly device, device group manager 115s authenticates the data transfer and sends a response to device 115o indicating that the data transfer is valid and to forward the data message to the next device (device 115r in this example) in the route. If device group manager 115s determines that device 115p is not a device group manager or a friendly device, device group manager 115s determines whether the CF value associated with device 115p is greater than or equal to a threshold CF value (also referred to as a data transfer validation threshold CF value). If the CF value associated with device 115p is less than the data transfer validation threshold CF value, device group manager 115s terminates the data transfer and notifies the source device indicating so. Otherwise, device group manager 115s authenticates the data transfer and sends a response to device 115o indicating that the data transfer is valid and to forward the data message to device 115r. In this example, device group manager 115s determines that device 115p is not an unfriendly device and that device 115p is a friendly device. Thus, device group manager 115s authenticates the data transfer and sends a response to device 115o indicating that the data transfer is valid and to forward the data message to device 115r.

In some embodiments, when device group manager 115s authenticates a data transfer, device group manager 115s encrypts a time value that represents a time in the future (e.g., a random time in the future) relative to the current time using the private key associated with device group manager 115s. When device group manager 115s does not authenticate the data transfer, device group manager 115s encrypts a time value that represents a time in the past (e.g., a random time in the past) relative to the current time using the private key associated with device group manager 115s. Device group manager 115s then sends the encrypted time value and an unencrypted copy of the time value along with the response to the data transfer authentication request to 115o.

Upon receiving a response to the data transfer authentication request, device 115o decrypts the encrypted time value using the public key associated with device group manager 115s. Device 115o then compares the decrypted time value and the unencrypted time value. If the time values match, device 115o determines that the response to the data transfer authentication request indeed came from device group manager 115s. If the decrypted time value represents a time in the past, device 115o determines that the data transfer is not valid. If the decrypted time value represents a time in the future, device 115o determines that the data transfer is valid. This way, a device (e.g., an unfriendly) is prevented from storing a response to a data transfer authentication request for later use.

The above data transfer authentication and validation process is repeated each time a device along the route receives the data message. In particular, for this example, the process is performed when device 115o receives the data message, when device 115r receives the data message, and when device 115t receives the data message.

When the destination device (device 115t in this example) receives the data message, the destination device notifies the device group manager whether the data transfer is intended, whether the transfer is successful, whether there was a delay in the data transfer (e.g., the time between initiating the data transfer at the source device and receiving the data transfer at the destination device is greater than a threshold transfer time), etc. If the destination device requested for data from the source device, then the destination device notifies the device group manager that the data transfer is intended and successful if the destination device determines that the payload of the data message as the appropriate response to the request. In some embodiments, the payload of the response is formatted according to a format that the destination device may parse and/or read. If the payload of the response is in such a format, the destination device determines that the data transfer is intended and successful and notifies the device group manager accordingly. Otherwise, the destination device notifies the device group manager that the data transfer is not intended and not successful. As another example, if the payload of the data message is a request (e.g., a request for data from the destination device) from the source device, the destination device determines that the data transfer is intended and notifies the device group manager accordingly if the payload of the request is formatted according to a format that the destination device may parse and/or read. Otherwise, the destination device notifies the device group manager that the data transfer is not intended. In some embodiments, a data transfer may also include a hash (e.g., a hash generated based on a secure hash algorithm 2 (SHA-2)) of the payload. In some such embodiments, the destination device calculates a hash of the payload and compares the calculated hash with the hash included in the payload. If the hashes match, the destination device determines that the data transfer is successful. Otherwise, the destination device determines that the data transfer is not successful.

Based on the notification from the destination device, the device group manager updates the CF values and CI values associated with the devices involved in the data transfer. When a destination device does not receive a data message from a data transfer, source device notifies the device group manager. In some embodiments, a data transfer timeout is associated with each data transfer initiated in system 100. If the device group manager does not receive a transfer result notification (e.g., a successful data transfer notification, an unsuccessful data transfer notification, etc.) from the destination device before the data transfer timeout elapses, the device group manager determines that the destination device did not receive the data message and that the data transfer is not successful and notifies the source device accordingly. In some embodiments, if an intermediate device does not forward the data message after a defined amount of time has elapsed, the device group manager determines that the data transfer is not successful and notifies the source device accordingly.

The above example illustrates a data transfer (also referred to as an intra-device group data transfer) between a source device and destination device in the same device group. In some instances, a data transfer (also referred to as an inter-device group data transfer) may be between a source device in one device group (also referred to as a source device group) and a destination device in another device group (also referred to as a destination device group). Referring to FIG. 3 as an example, device 115r in device group 130 may send data to device 115m in device group 125 via devices 115o and 115n.

In some embodiments, when a device group manager (device group manager 115s) in the source device group is determining whether to authenticate a data transfer from a device (device 115o in this example) in the source device group to a device (device 115n in this example) in the destination device group, the device group manager in the source device group forwards the authentication request to network manager 105. For this inter-device group transfer example, device 115s sends the authentication request to network manager 105. In response, network manager 105 identifies the destination device group (device group 125 in this example) of the device (device 115n in this example) to which the data message is to be forwarded. Network manager 105 forwards the authentication request to a device group manager (device group manager 115l in this example) in the identified destination device group.

For this example, device group manager 115l sends to network manager 105 a response that includes a classification of device 115n and, in the case that device 115n is classified as a biased or unfriendly device, an alternate route (or instructions to terminate the data transfer if no alternate route exists). Network manager 105 forwards the response to device group manager 115s. When device group manager 115s receives the response, device group manager 115s determines whether to authenticate the data transfer in the same or similar manner that device group manager 115s authenticates a data transfer in the intra-device group data transfer example described above.

In some embodiments, when a device (e.g., device 115n in this example) in the destination device group receives a data message from a device (device 115o in this example) in the source device group, the device in the destination device group sends a request to the device group manager (device group manager 115l in this example) to authenticate the data transfer. For this inter-device group transfer example, device 115l sends the authentication request to network manager 105. In response, network manager 105 identifies the source device group (device group 130 in this example) to which the device (device 115o in this example) that forwarded the data message to device 115n belongs. Network manager 105 forwards the authentication request to a device group manager (device group manager 115s in this example) in the identified source device group.

For this example, network manager 105 receives from device group manager 115s a response that includes a classification of device 115o and a number of data forwards of device 115o. Network manager 105 forwards the response to device group manager 115l. When device group manager 115l receives the response from network manager 105, device group manager 115l determines whether to authenticate the data transfer in the same or similar manner that device group manager 115s authenticates a data transfer in the intra-device group data transfer example described above.

As explained above, the device group manager updates the CF values and CI values associated with the devices involved in the data transfer based on the notification from the destination device. For inter-device group data transfers, the device group manager in each of the device groups involved in the data transfer updates the CF and CI values associated with the respective devices involved in the data transfer based on the notification from the destination device. For instance, the device group manager in the destination device group may notify network manager 105 that the data transfer is successful or not successful and network manager 105 forwards the notification to the device group manager in the source group. Continuing with the above example, device group manager 115*l* notifies network manager 105 that the data transfer is successful or not successful and network manager 105 forwards the notification to device group manager 115*s*. Device group manager 115*s* updates the CF values and CI values associated with devices 115*o* and 115*r* and device group manager 115*l* updates the CF values and CI values associated with devices 115*m* and 115*n*.

As discussed above, in some embodiments, a source device determines a route for the data transfer (e.g., using a shortest-path technique) and when the source device is unable to determine a route for the data transfer, the source device sends a requests to a device group manager to determine the route. When a device group manager receives a request to determine a route for a data transfer, the device group manager determines whether a route exists from the source device to the destination device based on the device group transfer graph. If the device group manager determines that a route does not exist, the device group manager forwards the request to determine a route to network manager 105.

In some embodiments, a device group manager (e.g., device group manager 115*s* or device group manager 115*l*) determines a route for a data transfer from a source device to a destination device based on the classification of devices as well as other factors. For instance, the device group manager may avoid routes that include a biased or unfriendly device. The device group manager may consider routes that include devices classified as cooperative devices over routes that do not include any cooperative devices. In some embodiments, the device group manager may consider routes that include cooperative devices that have a CI value (or average CI value) that is greater than a threshold CI value (also referred to as a route determination threshold CI value). In some such embodiments, the device group manager considers routes that include the cooperative device that has the highest CI values. When multiple paths are possible from an intermediate device in a route, the device group manager selects the path that includes the device that has the highest CF value. Upon determining a route for the data transfer, the device group manager sends the determined route to the source device. In some embodiments, network manager 105 may determine routes for data transfers in the same and/or similar fashion described above. For instance, when system 100 is operating in the initialization mode, source devices may send requests for route for data transfer to network manager 105.

As explained above, a data message includes a routing portion (e.g., routing header) and a data portion (e.g., a payload), in some embodiments, and such routing portion may include routing information for forwarding the data message from a source device to a destination device. When a source device sends to a device group manager a request to determine a route for a data transfer, the source device may also indicate in the request for the device group manager to encrypt the route information for forwarding the data message along the determined route.

Figure 4:
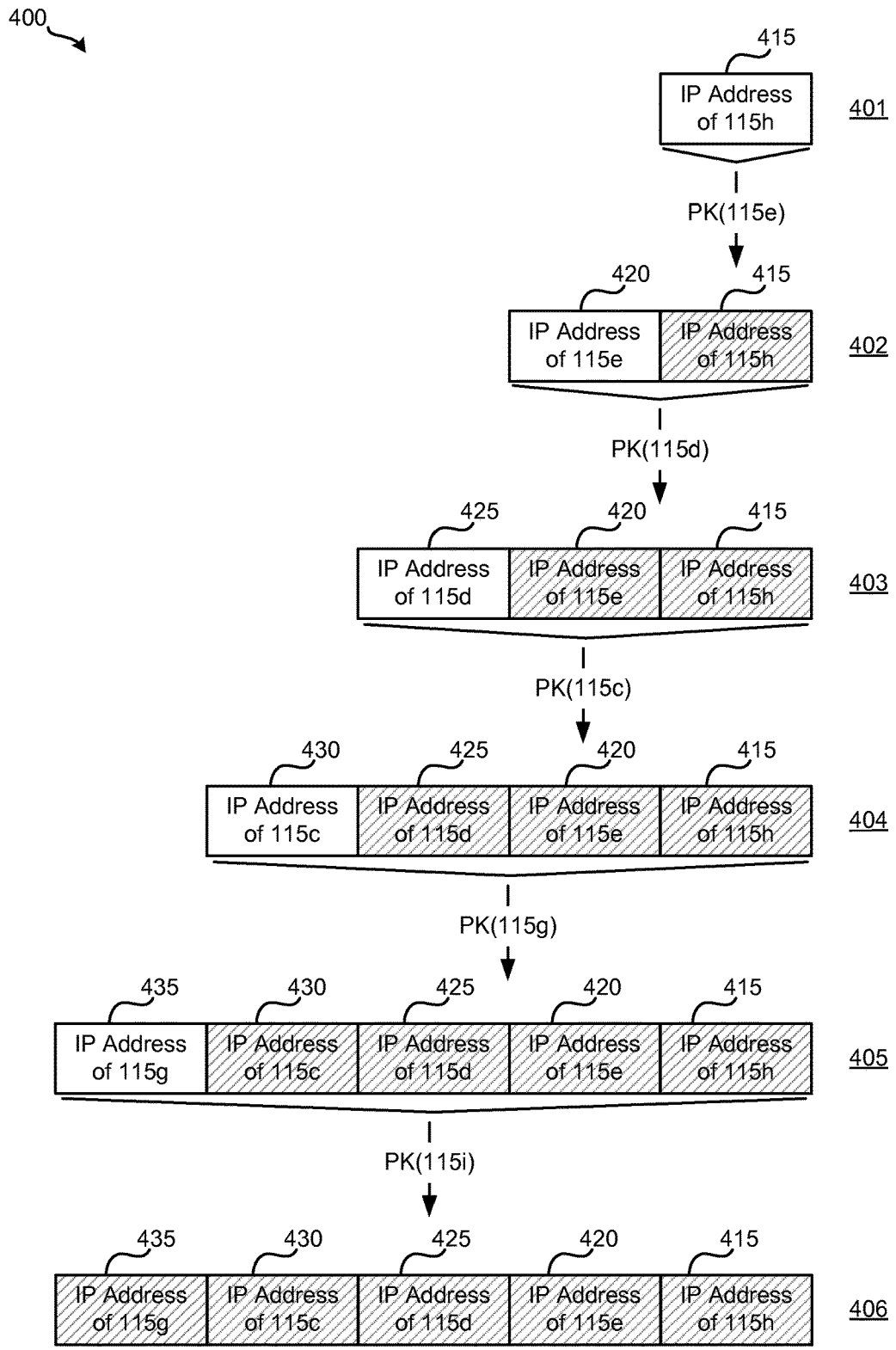
FIG. 4 illustrates selective encryption of routing information according to some embodiments.

In some embodiments, a device group manager employs a selective encryption technique to encrypt the routing information of a route. FIG. 4 illustrates selective encryption of routing information according to some embodiments. Specifically, FIG. 4 illustrates routing information 400 at six different stages 401-406 of encrypting routing information 400 for a data message. Referring to FIG. 2, routing information 400 corresponds to a route for a data message that starts at device 115*i*, goes through devices 115*g*, 115*c*, 115*d*, 115*e*, and ends at device 115*h*.

For this example, a device group manager of device group 120 starts the selective encryption of the example route by identifying the IP address of the destination device of in the route. As shown in the first stage 401, routing information 400 includes an IP address 415 of device 115*h*, which is the destination device in this example.

Next, the device group manager encrypts the IP address 415 of device 115*h* using the public key associated with the device that will forward the data message to device 115*h* and appends the encrypted IP address 415 to an IP address of the device that will forward the data message to device 115*h*. As illustrated in the second stage 402, routing information 400 includes the encrypted IP address 415 appended to an IP address 420 of device 115*e*, which is the device that will forward the data message to device 115*h*.

The device group manager then encrypts the encrypted IP address 415 along with the IP address 420 using the public key associated with the device that will forward the data message to device 115*e* and appends the encrypted IP addresses 415 and 420 to an IP address of the device that will forward the data message to device 115*e*. As shown in the third stage 403, routing information 400 includes the encrypted IP addresses 415 and 420 appended to an IP address 425 of device 115*d*, which is the device that will forward the data message to device 115*d*.

Next, the device group manager encrypts the encrypted IP addresses 415 and 420 along with the IP address 425 using the public key associated with the device that will forward the data message to device 115*d* and appends the encrypted IP addresses 415, 420, and 425 to an IP address of the device that will forward the data message to device 115*d*. As illustrated in the fourth stage 404, routing information 400 includes the encrypted IP addresses 415, 420, and 425 appended to an IP address 430 of device 115*c*, which is the device that will forward the data message to device 115*d*.

The device group manager then encrypts the encrypted IP addresses 415, 420, and 425 along with the IP address 430 using the public key associated with the device that will forward the data message to device 115*c* and appends the encrypted IP addresses 415, 420, 425, and 430 to an IP address of the device that will forward the data message to device 115*c*. As shown in the fifth stage 405, routing information 400 includes the encrypted IP addresses 415, 420, 425, and 430 appended to an IP address 435 of device 115*g*, which is the device that will forward the data message to device 115*c*.

Finally, the device group manager then encrypts the encrypted IP addresses 415, 420, 425, and 430 along with the IP address 435 using the public key associated with the device that will forward the data message to device 115*g*. Since the device that will forward the data message to device 115*g* is the source device, the device group manager is finished with the encryption of route information 400. The sixth stage 406 shows routing information 400 after the device group manager encrypts the IP addresses 415, 420, 425, 430, and 435. Upon completing the encryption of route information 400, the device group manager sends the encrypted routing information to the source device (device 115*i* in this example). FIG. 4 illustrates a device group manager selectively encrypting routing information. In some embodiments, if the device group manager does not have the public keys associated with the devices in the determined route, the device group manager sends a request to network manager 105 to perform the selective encryption of the determined route. Additionally, network manager 105 may be responsible for selectively encrypting routing information in some embodiments when system 100 is operating in the initialization mode. In some such embodiments, source devices may send requests for encrypting route information (as well as determining the route) to network manager 105.

Continuing with the example, when device 115i receives the encrypted routing information from the device group manager, device 115i generates a data message that includes data destined for the destination device (device 115h in this example). Device 115i decrypts routing information 400 (as illustrated in the sixth stage 406) using the private key associated with device 115i. Since IP address 435 was encrypted with the public key associated with device 115i, device 115i is able to read IP address 435 and identifies IP address 435 as the IP address of the device to which the data message is to be forwarded. Device 115i cannot access or read the IP addresses 415, 420, 425, and 430 as IP addresses 415, 420, 425, and 430 are encrypted with other public keys. As such, device 115i includes the encrypted IP addresses 415, 420, 425, and 430 as the routing portion of the data message. In some embodiments, device 115i encrypts the data destined for the destination device using the public key associated with the destination device. Device 115i then forwards the data message to device 115g.

When device 115g receives the data message, device 115g decrypts the routing information (as illustrated in the fifth stage 405 without IP address 435) of the data message using the private key associated with device 115g. Since IP address 430 was encrypted with the public key associated with device 115g, device 115g is able to read IP address 430 and identifies IP address 430 as the IP address of the device to which the data message is to be forwarded. Device 115g cannot access or read the IP addresses 415, 420, and 425 as IP addresses 415, 420, and 425 are encrypted with other public keys. Thus, device 115g removes IP address 430 from routing information 400 of the data message and forwards the data message to device 115c.

Upon receiving the data message, device 115c decrypts the remaining the routing information (as illustrated in the fourth stage 404 without IP address 430) of the data message using the private key associated with device 115c. Since IP address 425 was encrypted with the public key associated with device 115c, device 115c is able to read IP address 425 and identifies IP address 425 as the IP address of the device to which the data message is to be forwarded. Device 115c cannot access or read the IP addresses 415 and 420 as IP addresses 415 and 420 are encrypted with other public keys. Therefore, device 115c removes IP address 425 from the routing portion of the data message and forwards the data message to device 115d.

When device 115d receives the data message, device 115d decrypts the remaining the routing information (as illustrated in the third stage 403 without IP address 425) of the data message using the private key associated with device 115d. Since IP address 420 was encrypted with the public key associated with device 115d, device 115d is able to read IP address 420 and identifies IP address 420 as the IP address of the device to which the data message is to be forwarded. Device 115d cannot access or read the IP address 415 as IP address 415 is encrypted with another public key. As such, device 115d removes IP address 420 from the routing portion of the data message and forwards the data message to device 115e.

Upon receiving the data message, device 115e decrypts the remaining the routing information (as illustrated in the second stage 402 without IP address 420) of the data message using the private key associated with device 115e. Since IP address 415 was encrypted with the public key associated with device 115e, device 115e is able to read IP address 415 and identifies IP address 415 as the IP address of the device to which the data message is to be forwarded. As there is no routing information left, device 115e forwards the data message to device 115h, the destination device in this example.

Network manager 105 may perform the same and/or similar operations described above that are performed by a device group manager. For example, as explained above, devices are not yet classified when system 100 is operating in the initialization mode. As such, network manager 105 may receive data transfer requests from source devices for processing, generates transfer IDs, receive requests to determine routes (which may include requests to encrypt routes), receive requests from intermediate devices for validating data transfers, receive notifications from destination devices regarding the results of the data transfers, etc., when system 100 is operating in the initialization mode.

As described above, a device 115 may be classified as a biased device when the device 115 fails to forward data to one or more neighboring devices (among other factors). In some embodiments, a device group manager determines when a device 115 in the device group fails to forward data to neighboring devices by identifying, based on the transfer ID of the data transfer, information associated with the data transfer from the history of data transfers among devices 115 (e.g., the device group transfer graph). Based on the information associated with the data transfer, the device group manager identifies the device that failed to forward the data message along the route (also referred to as a candidate biased device).

The device group manager then sends to the candidate biased device a test data transfer request that requests the candidate biased device to forward the test data message to each of the neighboring devices of the candidate biased device. In some embodiments, the device group manager repeatedly sends the test data transfer request to the candidate biased device for a defined amount of time (e.g., five minute, fifteen minutes, thirty minutes, an hour, etc.) and records the results of the test data transfer requests.

If the results show that the test data transfer requests are not forwarded to one or more neighboring devices, the device group manager classifies the candidate biased device as a biased device (assuming the other factors are also satisfied) with respect to the one or more neighboring devices. The device group manager also sets the CI values of the candidate biased device associated with the one or more neighboring devices to zero.

If the results show that the test data transfer requests were forwarded to each of the neighboring devices, the device group manager identifies the device (also referred to as the forwarding device) in the data transfer that forwarded the data message to the candidate biased device. Next, the device group manager sends to the forwarding device a test data transfer request that requests the forwarding device to forward the test data message to the candidate biased device. If the candidate biased device rejects the data message, the device group manager sets the CI value of the candidate biased device associated with the forwarding device to zero. If the forwarding device does not forward the data message to the candidate biased device, the device group manager sets the CI value of the forwarding device associated with the candidate biased device to zero. In some embodiments, network manager 105 may determine when a device 115 in a device group fails to forward data to neighboring devices in the same and/or similar manner described above. For instance, when system 100 is operating in the initialization mode, source devices may send requests for route for data transfer to network manager 105.

As explained above, in some embodiments, a device 115 may be classified as an unfriendly device. In some embodiments, a device group manager generates and maintains a failed transfer graph that includes failed data transfers among devices 115 in the device group. The device group manager may classify devices 115 in the device group as unfriendly devices based on the failed transfer graph. In some embodiments, the device group manager synchronizes the failed transfer graph with network manager 105 at defined intervals (e.g., thirty minutes, an hour, twelve hours, a day, etc.).

Each device in the failed transfer graph is associated with an inverse credibility factor (ICF) value. When a data transfer among devices 115 in the device group fails (e.g., an invalid data transfer, the destination device does not receive the data message, the data transfer was delayed etc.), the device group manager adds to the failed transfer graph devices 115 involved in the data transfer that are not in the failed transfer graph and assigning such devices 115 each an initial ICF value (e.g., 1.0). The device group manager also updates the ICF values of devices 115 involved in the data transfer that are already in the failed transfer graph. In some embodiments, the device group manager updates the ICF value of a device 115 using the following equation:

$$ICF_n = ICF_{n-1} + k \times ICF_{n-1}$$

where $ICF_n$ is updated ICF value, $ICF_{n-1}$ is the previous ICF value, and k is a number (also referred to as a configuration parameter) between zero and one.

Figure 5:
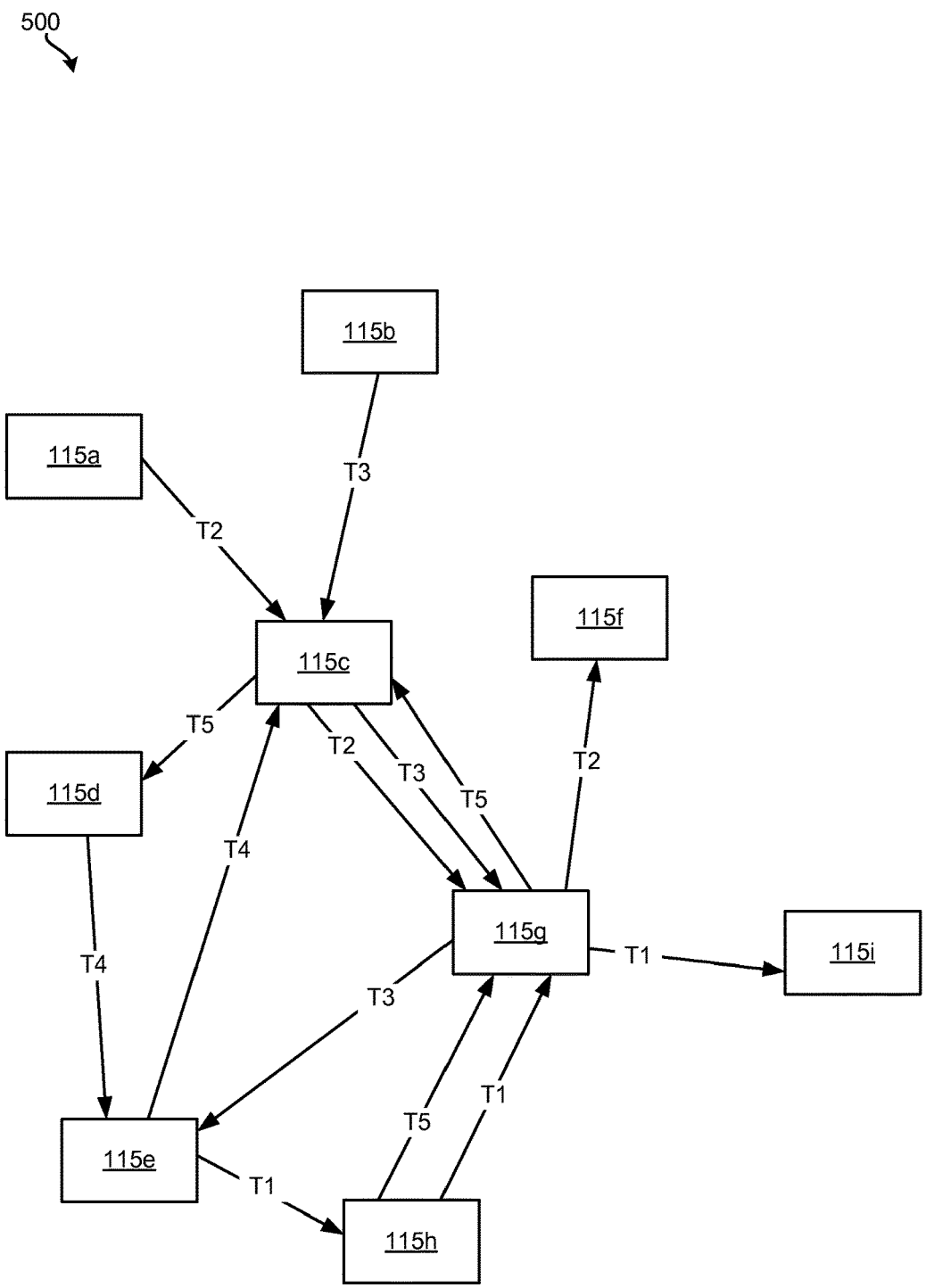
FIG. 5 illustrates a failed transfer graph according to some embodiments.

FIG. 5 illustrates a failed transfer graph according to some embodiments. In particular, FIG. 5 illustrates failed transfer graph 500 for device group 120. In some embodiments, a device group manager in device group 120 generates and manages failed transfer graph 500 in the fashion discussed above and below. As shown in FIG. 5, failed transfer graph 500 includes five failed data transfers: data transfer 1 (T1) starts at device 115e, goes through devices 115h and 115g, and ends at device 115i; data transfer 2 (T2) starts at device 115a, goes through devices 115c and 115g, and ending at device 115f; data transfer 3 (T3) starts at device 115b, goes through devices 115c and 115g, and ends at device 115e; data transfer 4 (T4) starts at device 115d, goes through device 115e, and ends at device 115c; and data transfer 5 (T5) starts at device 115h, goes through devices 115g and 115c, and ends at device 115d. For this example, the device group manager updates the ICF values of devices 115a-i using the above equation and a k value of 0.5. Based on the five failed data transfers in failed transfer graph 500, the current ICF values of the devices calculated by the device group manager are the following: $ICF_{115a}=1.0$; $ICF_{115b}=1.0$; $ICF_{115c}=3.375$; $ICF_{115d}=1.5$; $ICF_{115e}=2.25$; $ICF_{115f}=1.0$; $ICF_{115g}=3.375$; $ICF_{115h}=1.5$; and $ICF_{115i}=1.0$.

At defined intervals (e.g., fifteen minutes, thirty minutes, an hour, twelve hours, etc.), the device group manager searches the failed transfer graph and identifies devices (also referred to as candidate unfriendly devices) that have an ICF value that is greater than a threshold ICF value (also referred to as an unfriendly device threshold ICF value). The device group manager then reduces the CF values associated with the candidate unfriendly devices by a defined factor (e.g., 0.8, 0.9, etc.). If the CF value of a candidate unfriendly device falls below a threshold CF value (also referred to as an unfriendly device threshold CF value), the device group manager classifies the candidate unfriendly device as an unfriendly device.

Upon classifying a device as an unfriendly device, the device group manager identifies, based on the failed transfer graph, failed data transfer in which the unfriendly device is involved. The device group manager identifies devices that were involved in the identified failed data transfers. When the ICF value of an identified device falls below a threshold ICF value (also referred to as a device removal threshold ICF value), the device group manager removes the device from the failed transfer graph and sets the ICF value associated with the device to 0. Referring to FIG. 5 as an example, a device group manager in device group 120 may remove devices that have an ICF value that is less than 1.10. In some embodiments, the device group manager synchronizes data (e.g., ICF values, device classifications, etc.) with network manager 105 after classifying a device as an unfriendly device and removing devices from the failed transfer graph in the manner described above. In some embodiments, network manager 105 may classify devices 115 as unfriendly devices in the same and/or similar manner described above.

Figure 6:
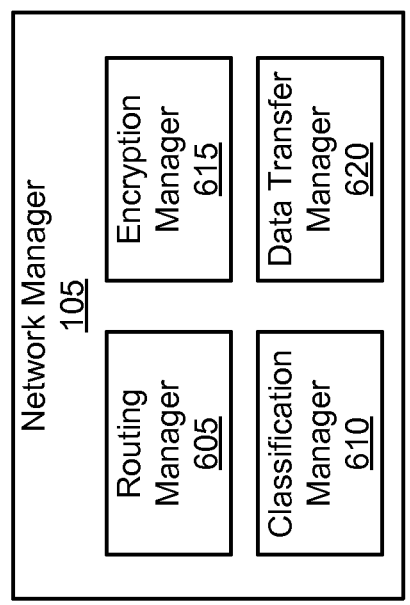
FIG. 6 illustrates a network manager according to some embodiments.

FIG. 6 illustrates a network manager according to some embodiments. As shown, network manager 105 includes routing manager 605, classification manager 610, encryption manager 615, and data transfer manager 620. Routing manager 605 is responsible for performing routing operations described above. For example, routing manager 605 generates and maintains transfer graphs (e.g., enrolled device transfer graphs, device group transfer graphs, etc.), determines routes for data transfer requests from source devices based on the classification of devices, etc.

Classification manager 610 handles the classification of devices 115. For instance, classification manager 610 may access the transfer graphs maintained by routing manager 605 to classify devices 115 (e.g., as neutral devices, friendly devices, device group managers, biased devices, unfriendly devices, cooperative devices, etc.), calculate metrics (e.g., CF values, CI values, etc.) based on the history of data transfers, determine when a device is not forwarding data messages to neighboring devices in order to classify devices as biased devices, generate and maintain failed transfer graphs as well as calculate ICF values in order to classify devices as unfriendly devices, etc.

Encryption manager 615 is responsible for encrypting routing information of routes determined by routing manager 605. For example, encryption manager 615 manages public keys associated with devices 115 and encrypts routing information in the manner described above by reference to FIG. 4.

Data transfer manager 620 handles operations related to data transfers among devices. For instance, data transfer manager 620 authenticates data transfer requests received from devices 115, validates data transfer requests received from devices 115, etc. Data transfer manager 620 may also handle data synchronization operations with device group managers.

Figure 7:
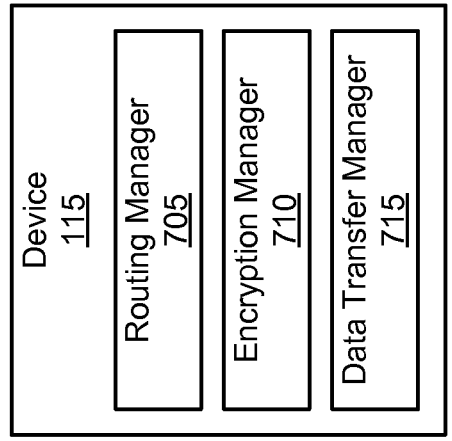
FIG. 7 illustrates a device according to some embodiments.

FIG. 7 illustrates a device 115 according to some embodiments. As illustrated, device 115 includes routing manager 705, encryption manager 710, and data transfer manager 715. Routing manager 705 performs routing operations discussed above. For instance, routing manager 705 generates and maintains transfer graphs (e.g., device group transfer graphs, etc.), determines routes for data transfer requests from source devices based on the classification of devices, calculate metrics (e.g., CF values, CI values, etc.) based on the history of data transfers, determine when a device is not forwarding data messages to neighboring devices in order to classify devices as biased devices, generate and maintain failed transfer graphs as well as calculate ICF values in order to classify devices as unfriendly devices, etc. In some embodiments, device 115 handles the routing operations when device 115 is operating as a device group manager.

Encryption manager 710 is responsible for encrypting routing information of routes determined by routing manager 705. For instance, encryption manager 710 manages public keys associated with devices 115 and encrypts routing information in the manner described above by reference to FIG. 4. In some embodiments, device 115 handles encrypting routing information when device 115 is operating as a device group manager.

Data transfer manager 715 handles operations related to data transfers among devices. For example, when device 115 is operating as a device group manager, data transfer manager 715 authenticates data transfer requests received from other devices, validates data transfer requests received from other devices, etc. When device 115 is operating as a device other than a device group manager (e.g., a neutral device, a friendly device, a biased device, etc.), data transfer manager 715 sends requests to a device group manager for authenticating and validating data transfer and synchronizes data with network manager 105.

Figure 8:
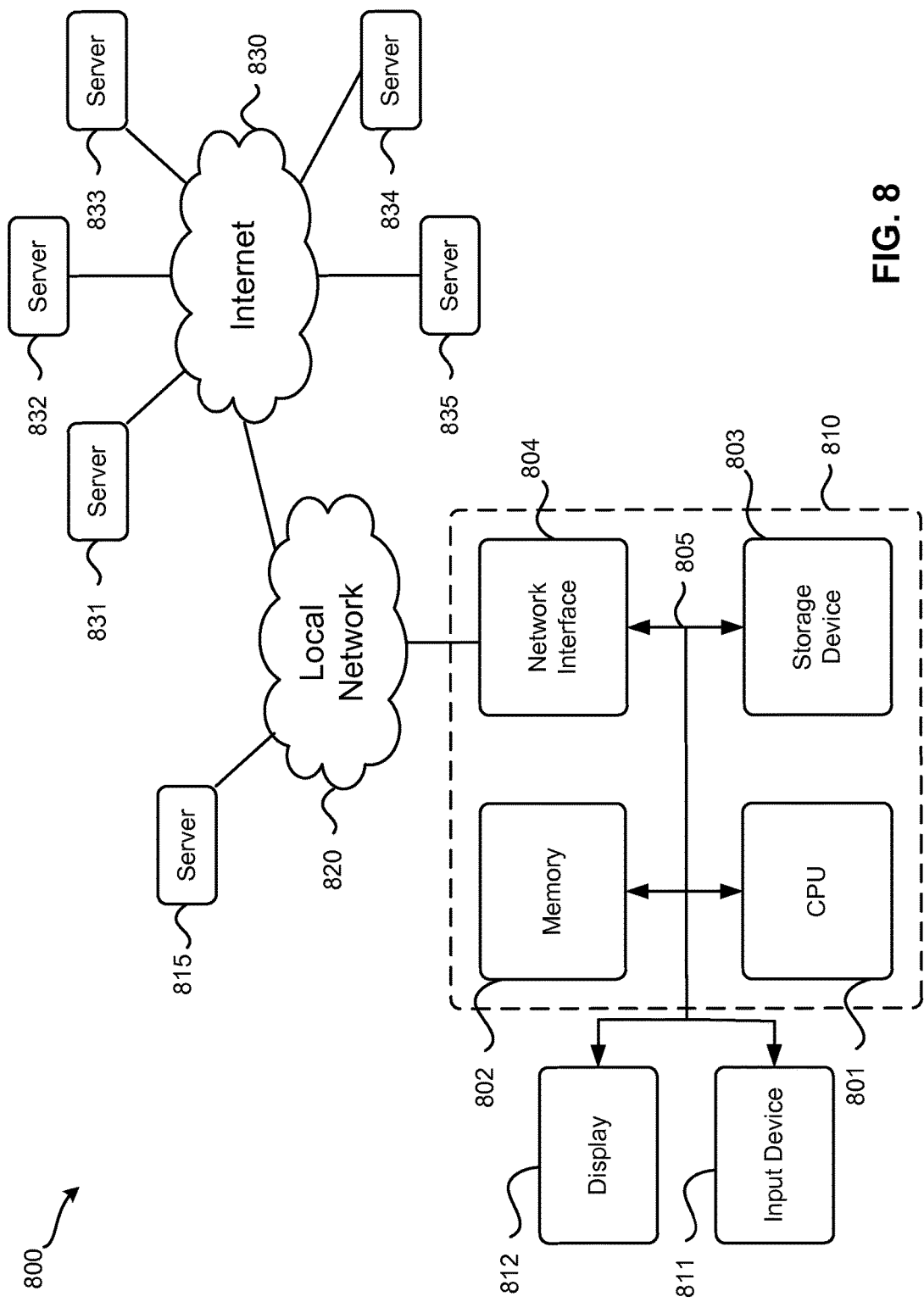
FIG. 8 illustrates an exemplary computer system according to some embodiments.

An exemplary computer system 800 is illustrated in FIG. 8. Computer system 810 includes a bus 805 or other communication mechanism for communicating information, and a processor 801 coupled with bus 805 for processing information. Computer system 810 also includes memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   calculating, by the device, a credibility factor value and a set of cooperative index values for each device in a plurality of connected devices based on a history of data transfers among the plurality of connected devices, wherein each device in the plurality of devices is connected to at least another device in the plurality of devices;
   classifying, by the device, each device in the plurality of connected devices as a type of device from a plurality of types of devices based on the credibility factor value calculate for the device and the set of cooperative index values calculated for the device;
   receiving, by the device and from a first device in the plurality of connected devices, a route request for transmitting a data message from the first device in the plurality of connected devices to a second device in the plurality of connected devices;
   determining, by the device, based on the type of device of each device in the plurality of connected devices, a route through the plurality of connected devices that starts at the first device and ends at the second device; and
   sending, by the device, the first device a message indicating that the data transfer is valid and instructing the first device to transmit the data message along the determined route to the second device.

2. The non-transitory machine-readable medium of claim 1, wherein the route request further specifies encryption of route information associated with the determined route, wherein the program further comprises a set of instructions for selectively encrypting, by the the device, the route information.

3. The non-transitory machine-readable medium of claim 1, wherein the route for transmitting the data message goes through a third device and a fourth device in the plurality of connected devices, wherein the program further comprises a set instructions for receiving, by the device, a request from a third device to authenticate and validate the data transfer in order for the third device to forward the data message to the fourth device.

4. The non-transitory machine-readable medium of claim 1, wherein the the credibility factors of each device in the plurality of connected devices is a ratio of a number of successful data transfers that involves the device to a number of total requested data transfers that involves the device, wherein each cooperative index value in the set of cooperative index values of each device in the plurality of connected devices is a ratio of a number of successful data forwards from the device to a neighboring device in the plurality of connected devices to a number of total requested data forwards from the device to the neighboring device.

5. The non-transitory machine-readable medium of claim 1, wherein the set of instructions for classifying the plurality of connected devices comprises a set of instructions for classifying, by the device, a third device in the plurality of connected devices as a type of device that forwards data messages to devices other than one or more neighboring devices of the particular device.

6. The non-transitory machine-readable medium of claim 5, wherein the type of device is a first type of device, wherein the set of instructions for classifying the plurality of connected devices comprises a set of instructions for classifying, by the device, a fourth device in the plurality of connected devices as a second type of device that is involved in a plurality of failed data transfers.

7. The non-transitory machine-readable medium of claim 6, wherein the set of instructions for determining the route through the plurality of connected devices comprises a set of instructions for including, by the device, devices in the plurality of connected devices in the route other than the third and fourth devices.

8. A method, executable by a device, comprising:
calculating, by the device, a credibility factor value and a set of cooperative index values for each device in a plurality of connected devices based on a history of data transfers among the plurality of connected devices, wherein each device in the plurality of devices is connected to at least another device in the plurality of devices;
classifying, by the device, each device in the plurality of connected devices as a type of device from a plurality of types of devices based on the credibility factor value calculate for the device and the set of cooperative index values calculated for the device;
receiving, by the device and from a first device in the plurality of connected devices, a route request for transmitting a data message from the first device in the plurality of connected devices to a second device in the plurality of connected devices;
determining, by the device, based on the type of device of each device in the plurality of connected devices, a route through the plurality of connected devices that starts at the first device and ends at the second device; and
sending, by the device, the first device a message indicating that the data transfer is valid and instructing the first device to transmit the data message along the determined route to the second device.

9. The method of claim 8, wherein the route request further specifies encryption of route information associated with the determined route, the method further comprising selectively encrypting, by the device, the route information.

10. The method of claim 8, wherein the route for transmitting the data message goes through a third device and a fourth device in the plurality of connected devices, wherein the method further comprises receiving, by the device, a request from a third device to authenticate and validate the data transfer in order for the third device to forward the data message to the fourth device.

11. The method of claim 8, wherein the the credibility factors of each device in the plurality of connected devices is a ratio of a number of successful data transfers that involves the device to a number of total requested data transfers that involves the device, wherein each cooperative index value in the set of cooperative index values of each device in the plurality of connected devices, is a ratio of a number of successful data forwards from the device to a neighboring device in the plurality of connected devices to a number of total requested data forwards from the device to the neighboring device.

12. The method of claim 8, wherein classifying the plurality of connected devices comprises classifying, by the device, a third device in the plurality of connected devices as a type of device that forwards data messages to devices other than one or more neighboring devices of the particular device.

13. The method of claim 12, wherein the type of device is a first type of device, wherein classifying the plurality of connected devices comprises classifying, by the device, a fourth device in the plurality of connected devices as a second type of device that is involved in a plurality of failed data transfers.

14. The method of claim 13, wherein determining the route through the plurality of connected devices comprises including, by the device, devices in the plurality of connected devices in the route other than the third and fourth devices.

15. A system comprising:
a set of processors; and
a non-transitory machine-readable medium storing instructions that when executed by at least one processor in the set of processors cause the at least one processor to:
calculate a credibility factor value and a set of cooperative index values for each device in a plurality of connected devices based on a history of data transfers among the plurality of connected devices, wherein each device in the plurality of devices is connected to at least another device in the plurality of devices;
classify each device in the plurality of connected devices as a type of device from a plurality of types of devices based on the credibility factor value calculate for the device and the set of cooperative index values calculated for the device;
receive, from a first device in the plurality of connected devices, a route request for transmitting a data message from the first device in the plurality of connected devices to a second device in the plurality of connected devices;

determine, based on the type of device of each device in the plurality of connected devices, a route through the plurality of connected devices that starts at the first device and ends at the second device; and send the first device a message indicating that the data transfer is valid and instructing the first device to transmit the data message along the determined route to the second device.

16. The system of claim 15, wherein the route request further specifies encryption of route information associated with the determined route, wherein the instructions further cause the at least one processor to selectively encrypt the route information.

17. The system of claim 15, wherein the route for transmitting the data message goes through a third device and a fourth device in the plurality of connected devices, wherein the instructions further cause the at least one processor to receive a request from a third device to authenticate and validate the data transfer in order for the third device to forward the data message to the fourth device.

18. The system of claim 15, wherein the the credibility factors of each device in the plurality of connected devices is a ratio of a number of successful data transfers that involves the device to a number of total requested data transfers that involves the device, wherein each cooperative index value in the set of cooperative index values of each device in the plurality of connected devices is a ratio of a number of successful data forwards from the device to a neighboring device in the plurality of connected devices to a number of total requested data forwards from the device to the neighboring device.

19. The system of claim 15, wherein classifying the plurality of connected devices comprises classifying a third device in the plurality of connected devices as a first type of device that forwards data messages to devices other than one or more neighboring devices of the particular device and classifying a fourth device in the plurality of connected devices as a second type of device that is involved in a plurality of failed data transfers.

20. The system of claim 19, wherein determining the route through the plurality of connected devices comprises including devices in the plurality of connected devices in the route other than the third and fourth devices.

* * * * *